(12) United States Patent
Baerenwald et al.

(10) Patent No.: US 12,306,600 B2
(45) Date of Patent: May 20, 2025

(54) ENGINE-DRIVEN POWER SYSTEMS HAVING LOAD MANAGEMENT PRIORITIZATION

(71) Applicant: Illinois Tool Works Inc., Glenview, IL (US)

(72) Inventors: Logan Thomas Baerenwald, Appleton, WI (US); Ross Neal Renner, Black Creek, WI (US); Richard C. Joyce, Sherwood, WI (US); Michael D. Madsen, Freemont, WI (US)

(73) Assignee: Illinois Tool Works Inc., Glenview, IL (US)

( * ) Notice: Subject to any disclaimer, the term of this patent is extended or adjusted under 35 U.S.C. 154(b) by 759 days.

(21) Appl. No.: 17/387,559

(22) Filed: Jul. 28, 2021

(65) Prior Publication Data

US 2022/0037885 A1  Feb. 3, 2022

Related U.S. Application Data

(60) Provisional application No. 63/059,614, filed on Jul. 31, 2020.

(51) Int. Cl.
*G05B 15/02* (2006.01)
*B23K 9/10* (2006.01)
*H02J 3/14* (2006.01)

(52) U.S. Cl.
CPC ............ *G05B 15/02* (2013.01); *B23K 9/1006* (2013.01); *H02J 3/144* (2020.01); *H02J 2310/60* (2020.01); *Y02B 70/3225* (2013.01)

(58) Field of Classification Search
CPC ....... B23K 9/10; B23K 9/1006; B23K 9/1056
See application file for complete search history.

(56) References Cited

U.S. PATENT DOCUMENTS 10,279,414 B2 *  5/2019  Enyedy ............... B23K 9/1006
2006/0086696 A1 *  4/2006  Ulrich .................... B23K 9/205
219/98

(Continued)

FOREIGN PATENT DOCUMENTS

CA  2713345  8/2009
CA  2877784  1/2014

OTHER PUBLICATIONS

Canadian Office Action Appln No. 3,126,496 dated Nov. 28, 2023.

*Primary Examiner* — John J Norton
(74) *Attorney, Agent, or Firm* — McAndrews, Held & Malloy, Ltd.

(57) ABSTRACT

An example engine-driven power system includes: an engine; a generator configured to convert mechanical engine power to electrical power; first and second power subsystems configured to convert the mechanical or electrical power to first and second power outputs, wherein the first and second power subsystems are configurable to output the first and second power outputs simultaneously; an input device configured to control a load management priority, wherein the load management priority comprises at least one of an adjustable ranking, an adjustable balance, or bus voltage thresholds; and control circuitry configured to: control the first and second power subsystems to output the first and second power outputs based on first and second demands; and, in response to determining that a total demand exceeds a capacity, control the first or second power subsystems to reduce the power outputs or the demands based on the load management priority.

14 Claims, 7 Drawing Sheets

(56) References Cited

U.S. PATENT DOCUMENTS

| | | | | |
|---|---|---|---|---|
| 2008/0264922 A1* | 10/2008 | Fosbinder | .............. | F02B 63/04 |
| | | | | 219/130.21 |
| 2008/0308540 A1* | 12/2008 | Hiroi | ................... | B23K 9/0956 |
| | | | | 219/133 |
| 2009/0194067 A1* | 8/2009 | Peotter | ............... | F02D 41/0205 |
| | | | | 701/102 |
| 2018/0043454 A1* | 2/2018 | Smith | ................. | B23K 9/1006 |
| 2018/0056426 A1* | 3/2018 | Batzler | ............... | B23K 9/1081 |
| 2019/0240762 A1* | 8/2019 | Ihde | ........................ | B23K 9/12 |

* cited by examiner

ENGINE-DRIVEN POWER SYSTEMS HAVING LOAD MANAGEMENT PRIORITIZATION

RELATED APPLICATIONS

The present application claims the benefit of U.S. Patent Application Ser. No. 63/059,614, filed Jul. 31, 2020, entitled "engine-driven power SYSTEMS HAVING LOAD MANAGEMENT PRIORITIZATION." The entirety of U.S. Patent Application Ser. No. 63/059,614 is expressly incorporated herein by reference.

BACKGROUND

This disclosure relates generally to welding systems and, more particularly, to engine-driven power systems having load management priority.

An electronically controlled welding power source will attempt to deliver whatever output power the power source is commanded to deliver. If the engine does not have enough power to supply the commanded load, a fold back circuit reduces the load in an attempt to match the available engine power.

SUMMARY

Engine-driven power systems having load management prioritization are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to identify similar or identical components.

DETAILED DESCRIPTION

Figure 1:
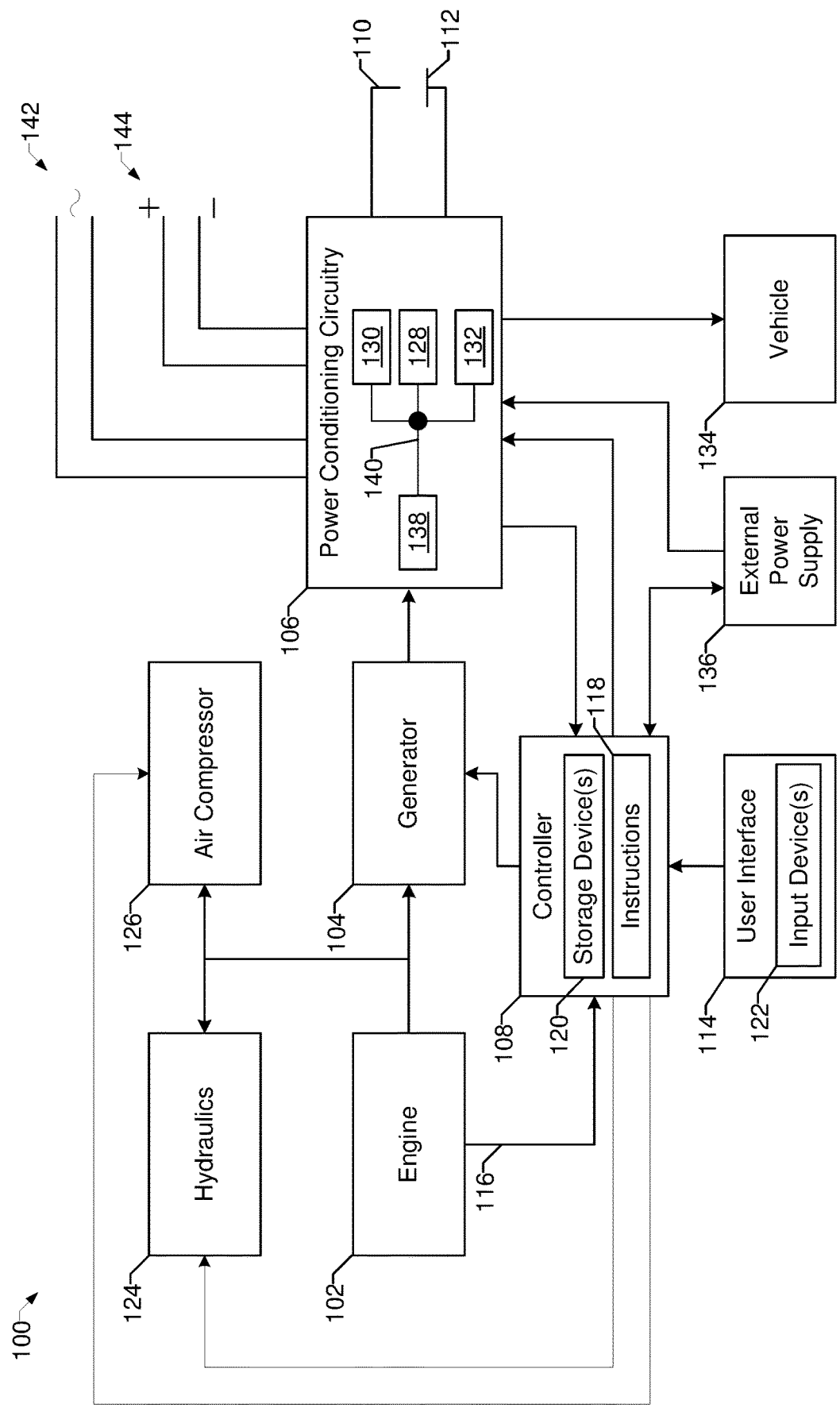
FIG. 1 is a schematic diagram of an example engine-driven power systems including a user interface for configuring load management prioritization, in accordance with aspects of this disclosure.

Conventional engine-driven power systems may provide mechanical and/or electrical power to different types of outputs, some of which may be operated simultaneously. To avoid stalling, conventional engine-driven power systems reduce one or more of the outputs when the total load on the engine exceeds the engine's output capacity. However, conventional engine-driven welders are configured or programmed with specific orders in which the loads are to be reduced or halted, in which the order may be dictated by anticipated user preferences.

Disclosed example engine-driven power systems enable the operator to specify a load management priority via a user interface, and control the folding back of power subsystems of the engine-driven power systems via the specified load management priority. Example load management priorities that may be implemented by disclosed examples include: enabling the operator to select one power subsystem as having precedence over a second power subsystem; enabling the operator to specify a power ratio for two or more power subsystems, and folding back the two or more power subsystems simultaneously according to the ratio; enabling the operator to rank three or more power subsystems, and folding back the power subsystems according to the ranking; and/or enabling the operator to specify voltage ranges of an intermediate voltage bus that feeds one or more power subsystems, and folding back the one or more power subsystems based on the measured voltage of the intermediate voltage bus.

Disclosed example engine-driven power systems may include power subsystems such as a hydraulic system configured to output hydraulic power; an air compressor configured to output pneumatic power; a welding-type power supply (e.g., a switched-mode power supply) configured to output welding-type power; an auxiliary power supply (e.g., a switched-mode power supply) configured to output at least one of AC power (e.g., 120 VAC, 240 VAC, etc.) or DC power (e.g., 12 VDC, 24 VDC), battery charging power, chassis power, power to supply one or more components of a vehicle to which the engine-driven power system is connected, and/or any other form of electrical power; a detachable external power supply configured to receive electrical power from the engine-driven power system when plugged in, and to communicate with the engine-driven power system to enable control and/or folding back of the external power supply; and/or any other type of power subsystem.

The terms "foldback" and "folding back," as used herein, refer to the reduction of output by a power subsystem by controlling the power subsystem to decrease the output or demand by the power subsystem. Folding back may be accomplished by controlling an input to the power subsystem, by commanding the power subsystem (e.g., via a control loop) to reduce its own demand or output, and/or by any other technique. As used herein, folding back may be performed on power subsystems having mechanical and/or electrical outputs. Folding back may be proportional, in that more folding back of a power subsystem results in a lower output, less folding back results in a higher output, and complete folding back results in no output.

The term "welding-type output," as used herein, refers to an output suitable for welding, plasma cutting, induction heating, CAC-A and/or hot wire welding/preheating (including laser welding and laser cladding).

Disclosed example engine-driven power systems include: an engine; a generator configured to convert mechanical power output by the engine to electrical power; a first power subsystem configured to convert at least one of the mechanical power or the electrical power to a first power output; a second power subsystem configured to convert at least one of the mechanical power or the electrical power to a second power output, wherein the first power subsystem and the second power subsystem are configurable to output at least a portion of the first power output and at least a portion of the second power output simultaneously; an input device configured to control a load management priority associated with the first power subsystem and the second power subsystem, wherein the load management priority comprises at least one of an adjustable ranking of the first and second power subsystems, an adjustable balance between the first and second power subsystems, or bus voltage thresholds for the first and second power subsystems; and control circuitry configured to: control the first power subsystem to output the first power output based on a first demand; control the second power subsystem to output the second power output based on a second demand; and in response to determining that a total demand, including the first demand and the second demand, exceeds a capacity of the engine, control at least one of the first power subsystem to reduce the first power output or the first demand or the second power subsystem to reduce the second power output or the second demand based on the load management priority.

In some example engine-driven power systems, the first power subsystem includes at least one of: a hydraulic system configured to output the first power output as hydraulic power; an air compressor configured to output the first power output as pneumatic power; a welding-type power supply configured to output the first power output as welding-type power; an auxiliary power supply configured to output the first power output as at least one of AC power or DC power; an external power supply configured to convert at least one of the AC power or the DC power from the auxiliary power supply or the generator to at least one of AC power or DC power and configured to communicate with the controller; or a vehicle subsystem configured to convert the electrical power to at least one of AC power or DC power to power at least one component of a vehicle on which the engine-driven power system is mounted.

In some example engine-driven power systems, the second power subsystem includes at least one of: a hydraulic system configured to output the second power output as hydraulic power; an air compressor configured to output the second power output as pneumatic power; a welding-type power supply configured to output the second power output as welding-type power; an auxiliary power supply configured to output the first power output as at least one of AC power or DC power; an external power supply configured to convert at least one of the AC power or the DC power from the auxiliary power supply or the generator to at least one of AC power or DC power and configured to communicate with the controller; or a vehicle subsystem configured to convert the electrical power to at least one of AC power or DC power to power at least one component of a vehicle on which the engine-driven power system is mounted.

In some example engine-driven power systems, the load management priority includes a selection of a first one of the first power subsystem or the second power subsystem as having priority over a second one of the first power subsystem or the second power subsystem. In some such examples, the control circuitry is configured to, in response to determining that the total demand exceeds the capacity of the engine, fold back the second one of the first power subsystem or the second power subsystem while the total demand exceeds the capacity of the engine. In some examples, the control circuitry is configured to, in response to determining that the total demand exceeds the capacity of the engine and the second one of the first power subsystem or the second power subsystem is completely folded back, fold back the first one of the first power subsystem or the second power subsystem while the total demand exceeds the capacity of the engine.

Some example engine-driven power systems further include a pre-regulator configured to convert the electrical power from the generator to output a voltage bus based on a target bus voltage, and the first power subsystem and the second power subsystem are coupled to receive the electrical power from the voltage bus. In some such examples, the control circuitry is configured to determine that the total demand exceeds the capacity of the engine based on a voltage of the voltage bus. In some examples, the load management priority includes a first bus voltage threshold associated with the first power subsystem and a second bus voltage threshold associated with the second power subsystem, and the control circuitry is configured to: fold back the first power subsystem while the voltage bus is less than the first bus voltage threshold; and fold back the second power subsystem while the voltage bus is less than the second bus voltage threshold.

Some example engine-driven power systems further include a third power subsystem configured to convert at least one of the mechanical power or the electrical power to a third power output, wherein the load management priority includes a ranking of the first power subsystem, the second power subsystem, and the third power subsystem. In some such examples, the control circuitry is configured to fold back at least one of the first power subsystem, the second power subsystem, or the third power subsystem, based on the ranking, while the total demand exceeds the capacity of the engine. In some examples, the control circuitry is configured to determine the ranking based on values received via the input device.

In some example engine-driven power systems, the load management priority includes the adjustable balance between the first power subsystem and the second power subsystem, and the control circuitry is configured to proportionally fold back the first power subsystem and the second power subsystem based on the balance while the total demand exceeds the capacity of the engine.

Additional disclosed example engine-driven power systems include: an engine; a generator configured to convert mechanical power output by the engine to electrical power;

a hydraulic subsystem configured to convert at least one of the mechanical power or the electrical power to a hydraulic output; a pneumatic subsystem configured to convert at least one of the mechanical power or the electrical power to a pneumatic output, wherein the hydraulic subsystem and the pneumatic subsystem are configurable to output at least a portion of the hydraulic output and at least a portion of the pneumatic output simultaneously; an input device configured to control a load management priority associated with the hydraulic subsystem and the pneumatic subsystem, wherein the load management priority includes at least one of an adjustable ranking of the hydraulic subsystem and the pneumatic subsystem, an adjustable balance between the hydraulic subsystem and the pneumatic subsystem, or bus voltage thresholds for the hydraulic subsystem and the pneumatic subsystem; and control circuitry configured to: control the hydraulic subsystem to output the hydraulic output based on a hydraulic demand; control the pneumatic subsystem to output the pneumatic output based on a pneumatic demand; and in response to determining that a total demand, including the hydraulic demand and the pneumatic demand, exceeds a capacity of the engine, control at least one of the hydraulic subsystem to reduce the hydraulic output or the hydraulic demand or the pneumatic subsystem to reduce the pneumatic output or the pneumatic demand based on the load management priority.

In some example engine-driven power systems, the load management priority includes a selection of a first one of the hydraulic subsystem or the pneumatic subsystem as having priority over a second one of the hydraulic subsystem or the pneumatic subsystem. In some example engine-driven power systems, the control circuitry is configured to, in response to determining that the total demand exceeds the capacity of the engine, fold back the second one of the hydraulic subsystem or the pneumatic subsystem while the total demand exceeds the capacity of the engine.

Some example engine-driven power systems further include an electrical power subsystem configured to convert the electrical power to at least one of a welding-type power output, an AC power output, or a DC power output, wherein the load management priority includes a ranking of the hydraulic subsystem, the pneumatic subsystem, and the electrical power subsystem. In some examples, the control circuitry is configured to fold back at least one of the hydraulic subsystem, the pneumatic subsystem, or the electrical power subsystem, based on the ranking, while the total demand exceeds the capacity of the engine. In some example engine-driven power systems, the load management priority includes a balance between the hydraulic subsystem and the pneumatic subsystem, and the control circuitry is configured to fold back at least one of the hydraulic subsystem and the pneumatic subsystem while the total demand exceeds the capacity of the engine proportionally based on the balance. In some example engine-driven power systems, the control circuitry is configured to determine that the total demand exceeds the capacity of the engine when a difference between a determined engine speed and a target engine speed is at least a threshold.

Disclosed example methods involve: converting mechanical power output by an engine to electrical power; converting at least one of the mechanical power or the electrical power to a first power output; converting at least one of the mechanical power or the electrical power to a second power output, wherein at least a portion of the first power output and at least a portion of the second power output are output simultaneously; determining a load management priority associated with the first power output and the second power output, wherein the load management priority includes at least one of an adjustable ranking of the first and second power subsystems, an adjustable balance between the first and second power subsystems, or bus voltage thresholds for the first and second power subsystems; monitoring a total demand on the engine, the total demand including a first demand of the first power output and a second demand of the second power output; and, in response to determining that the total demand exceeds a capacity of the engine, reducing the first power output or the first demand, or the second power output or the second demand, based on the load management priority.

FIG. 1 is a schematic diagram of an example engine-driven power system 100 implementing output reduction. The example engine-driven power system 100 includes an engine 102, a generator 104, power conditioning circuitry 106, and a controller (e.g., a control circuit) 108.

The engine 102 is mechanically coupled or linked to a rotor of the generator 104. The engine 102 is controllable to operate at multiple speeds, such as an idle (e.g., no or minimal load speed) and a maximum speed (e.g., the maximum rated power of the engine 102). The engine speed may be increased and/or decreased based on the load. The generator 104 generates output power based on the mechanical input from the engine 102. In some examples, the generator 104 is implemented using a high-output alternator. Collectively, the engine 102 and the generator 104 provide mechanical power and/or electrical power to power subsystems. In some examples, the generator 104 may be omitted for systems that do not include electrical subsystems.

The example power system 100 includes power subsystems such as power conditioning circuitry 106, a hydraulic system 124 configured to output hydraulic power, and/or an air compressor 126 configured to output pneumatic power. The example hydraulic system 124 and the air compressor 126 may be powered by mechanical power from the engine 102 and/or by electrical power from the generator 104.

The example power conditioning circuitry 106 may include one or more power subsystems, such as a welding-type power supply 128 configured to output welding-type power, an auxiliary power supply 130 configured to output AC power and/or DC power, and/or a vehicle power subsystem 132 configured to convert electrical power to at least one of AC power or DC power to power at least one component of a vehicle 134 on which the engine-driven power system 100 is mounted.

In some examples, an external power supply subsystem 136 may be coupled (e.g., plugged in, hardwired, etc.) to the power conditioning circuitry 106 convert at least one of the AC power or the DC power from the auxiliary power supply 130 and/or the generator 104 to at least one of AC power or DC power, such as to power external devices that have different power requirements. The example external power supply subsystem 136 may also be communicatively coupled to the control circuitry 108 (e.g., wirelessly, via power line communication, via a communication cable, etc.) to enable the control circuitry 108 to control the demand and/or output of the external power supply subsystem 136.

The example power conditioning circuitry 106 includes a rectifier/preregulator circuit 138 that converts the AC power from the generator 104 to an intermediate voltage bus 140 having a bus voltage. The rectifier/preregulator circuit 138 controls the bus voltage to remain substantially constant. However, in the event that the total demand on the engine 102 exceeds the capacity of the engine 102, the rectifier/preregulator circuit 138 may not receive sufficient power to maintain the bus voltage, and the bus voltage decreases proportionally to the excess demand on the engine 102. Each of the example welding-type power supply 128, auxiliary power supply 130, and/or vehicle power subsystem 132 receives power from the intermediate voltage bus 140.

The welding-type power supply 128 converts output power from the generator 104 (e.g., via the intermediate voltage bus 140) to welding-type power based on a commanded welding-type output. The welding-type power supply 128 provides current at a desired voltage to an electrode 110 and a workpiece 112 to perform a welding-type operation. As described in more detail below, the power conditioning circuitry 106 may include, for example, a switched mode power supply or an inverter fed from an intermediate voltage bus. Power conditioning circuitry may include a direct connection from a power circuit to the output (such as to the weld studs), and/or an indirect connection through power processing circuitry such as filters, converters, transformers, rectifiers, etc.

The auxiliary power supply 130 converts output power from the generator 104 (e.g., via the intermediate voltage bus 140) to AC power (e.g., 120 VAC, 240 VAC, 50 Hz, 60 Hz, etc.) and/or DC power (e.g., 12 VDC, 24 VDC, battery charging power, etc.). The auxiliary power supply 130 outputs one or more AC power outputs 142 (e.g., AC outlets or receptacles) and/or one or more DC power outputs 144 (e.g., DC outlets or receptacle). Similarly, the vehicle power subsystem 132 converts output power from the generator 104 (e.g., via the intermediate voltage bus 140) to AC power (e.g., 120 VAC, 240 VAC, 50 Hz, 60 Hz, etc.) and/or DC power (e.g., 12 VDC, 24 VDC, battery charging power, etc.), and outputs the power to the vehicle 134. In some examples, the vehicle 134 may be configured to communicate with the control circuitry 108 via a vehicle communication bus, a power system communication bus, a wireless network, and/or any other type of communication.

The power system 100 enables multiple ones of the power subsystems (e.g., the power conditioning circuitry 106, the hydraulic system 124, the air compressor 126, the welding-type power supply 128, the auxiliary power supply 130, the vehicle power subsystem 132, the external power supply subsystem 136, etc.) to be operated simultaneously. As a result, the demand placed on the engine 102 by the individual power subsystems results in a total demand on the engine 102.

A user interface 114 enables selection of a commanded power level or welding-type output, such as a current or voltage level to be used for welding-type operations, such as via one or more input device(s) 122. Example input devices may include selector switches, knobs, a touchscreen, buttons, a mouse, a keyboard or keypad, and/or any other type of input device. The user interface 114 additionally or alternatively enables selection of one or more speeds for the engine 102 (e.g., in RPM), such as an idle engine speed and/or engine speed under load.

The example control circuitry 108 may include digital and/or analog circuitry, discrete or integrated circuitry, microprocessors, digital signal processors (DSPs), field programmable gate arrays (FPGAs), and/or any other type of logic circuits. The example control circuitry 108 may be implemented using any combination of software, hardware, and/or firmware. The control circuitry 108 executes machine readable instructions 118 which may be stored on one or more machine readable storage device(s) 120 such as volatile and/or non-volatile memory, hard drives, solid state storage, and the like.

The control circuitry 108 receives an engine speed input from the engine 102 or a sensor, and obtains the commanded engine speed and/or the commanded welding-type output from the user interface 114. When the control circuitry 108 determines that a load on the welding-type output is causing the engine speed to drop (e.g., by more than a threshold drop in speed) or to fail to accelerate to match the load, the control circuitry 108 reduces the power output by one or more of the power subsystems, and/or controls the power subsystems to reduce the demand by those subsystems, based on a configurable load management priority. As described in more detail below, the example input device(s) 122 enable an operator to configure the load management priority to control how power subsystems are folded back in the event that a total demand on the engine 102 exceeds the capacity of the engine 102.

Figure 2A:
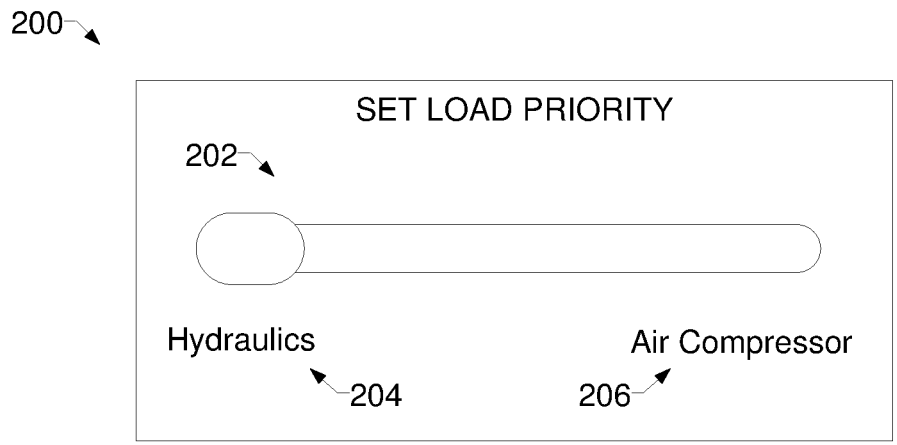
FIGS. 2A and 2B illustrate example user interfaces that may be used to configure a load management priority of the engine-driven power systems of FIG. 1 by configuring load priorities.

FIG. 2A illustrates an example user interface 200 that may be used to configure a load management priority of the engine-driven power system 100 of FIG. 1 by configuring load priorities. The example user interface 200 may implement the user interface 114 of FIG. 1, and receive inputs via the input device(s) 122.

The user interface 200 includes a slider bar 202 that may be manipulated via the input device(s) 122 to select between a first power subsystem 204 (e.g., the hydraulic system 124) and a second power subsystem 206 (e.g., the air compressor 126). Based on the selection, the control circuitry 108 folds back the non-selected power subsystem in response to determining that a total demand on the engine 102 (e.g., the demands by the first power subsystem 204 and the second power subsystem 206) exceeds a capacity of the engine 102. In the example of FIG. 2A in which the hydraulic system 124 is selected for priority, the control circuitry 108 controls the air compressor 126 to fold back (e.g., reduce power output, reduce demand) completely before beginning to fold back the hydraulic system 124.

Figure 2B:
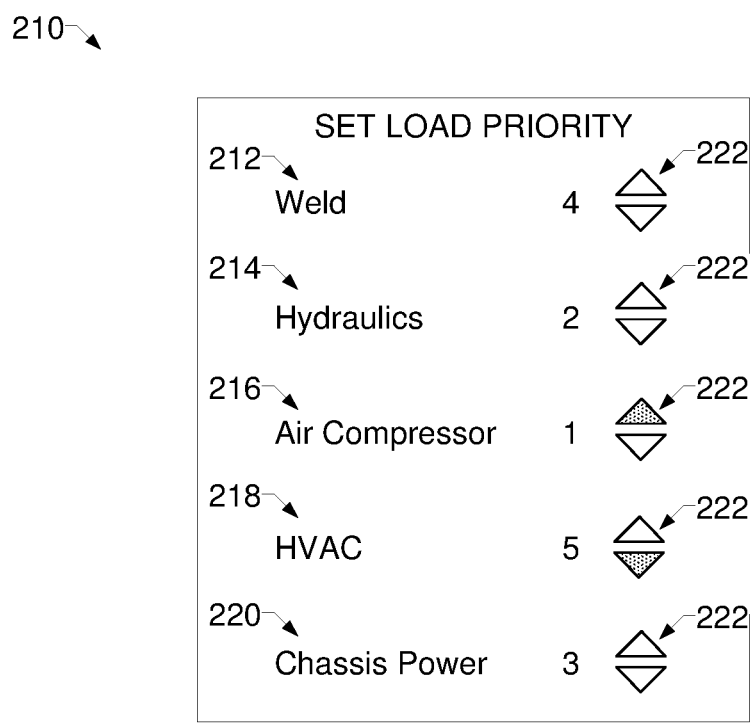

FIG. 2B illustrates another example user interface 210 that may be used to configure a load management priority of the engine-driven power system 100 of FIG. 1 by configuring load priorities. The user interface 210 lists multiple power subsystems 212-220, and enables ranking of the subsystems 212-220 via the input device(s) 122. The power subsystems in the example of FIG. 2B include a welding subsystem 212 (e.g., the welding-type power supply 128), a hydraulics subsystem 214 (e.g., the hydraulic system 124), an air compressor subsystem 216 (e.g., the air compressor 126), an HVAC subsystem 218 (e.g., the external power supply subsystem 136), and a chassis power subsystem 220 (e.g., the vehicle power subsystem 132).

In the example interface 210, each of the subsystems 212-220 includes directional indicators 222 to enable the operator to change the ranking of the respective subsystems 212-220. In other examples, the rankings may be changed by moving the names of the subsystems 212-220 to a location representative of the desired ranking, by enabling numerical input (e.g., via a keypad) to specify the ranking, and/or any other method of adjusting the rankings of the subsystems.

Based on the ranking, the control circuitry 108 folds back the power subsystems 212-220 in order in response to determining that a total demand on the engine 102 (e.g., the demands by two or more of the subsystems 212-220) exceeds a capacity of the engine 102. Using the rankings, the control circuitry 108 completely folds back lower ranking power subsystems 212-220 prior to starting to fold back higher ranking subsystems 212-220. In the example of FIG. 2B, while the engine speed is less than a threshold speed (indicating that the engine is overloaded), the control circuitry 108 would fold back the HVAC subsystem 218, followed by the welding subsystem 212 (e.g., after the HVAC subsystem 218 is completely folded back to a demand of 0), the chassis power subsystem 220 (e.g., after the welding subsystem 212 is completely folded back to a demand of 0), the hydraulics subsystem 214 (e.g., after the chassis power subsystem 220 is completely folded back to a demand of 0), and finally the air compressor subsystem 216 (e.g., after the hydraulics subsystem 214 is completely folded back to a demand of 0).

Conversely, as the total demand on the engine 102 reduces to below the capacity of the engine 102, the control circuitry 108 may restore the demands by the subsystems 212-220 according to the rankings.

Figures 3, 4:
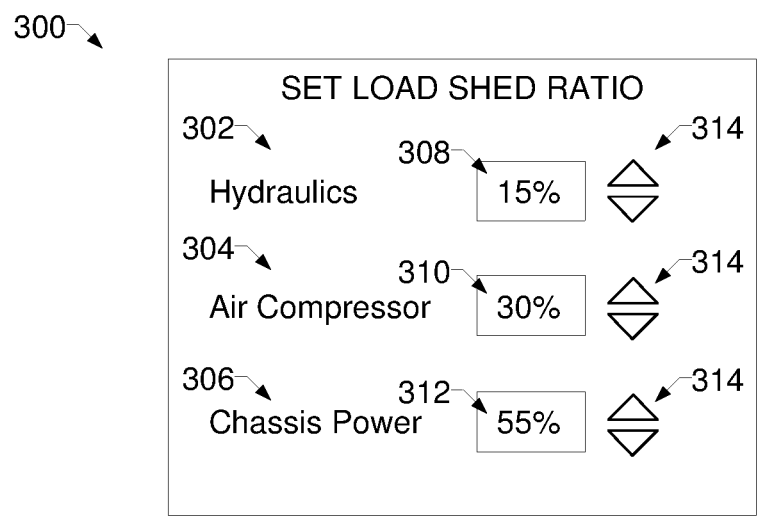
FIG. 3 illustrates another example user interfaces that may be used to configure a load management priority of the engine-driven power systems of FIG. 1 by configuring load shedding ratios.
FIG. 4 illustrates another example user interface that may be used to configure a load management priority of the engine-driven power systems of FIG. 1 by configuring voltage bus limits associated with different loads powered via a voltage bus.

FIG. 3 illustrates another example user interface 300 that may be used to configure a load management priority of the engine-driven power supply of FIG. 1 by configuring load shedding ratios. The user interface 300 lists multiple power subsystems 302-306, and enables distribution of load shedding of the subsystems 302-306 via the input device(s) 122. The power subsystems in the example of FIG. 3 a hydraulics subsystem 302 (e.g., the hydraulic system 124), an air compressor subsystem 304 (e.g., the air compressor 126), and a chassis power subsystem 306 (e.g., the vehicle power subsystem 132).

Each of the subsystems 302-306 in the interface 300 is associated with a respective load shedding proportion 308-312. The input device(s) 122 may be used to enter a numeric value for the load shedding proportions 308-312, and/or may be used to adjust the proportions 308-312 via respective directional indicators 314.

Based on the ranking, the control circuitry 108 folds back the power subsystems 302-306 simultaneously based on the proportions 308-312 in response to determining that a total demand on the engine 102 (e.g., the demands by two or more of the subsystems 302-306) exceeds a capacity of the engine 102. The control circuitry 108 folds back each of the subsystems 302-306 proportionally according to the associated proportion value 308-312. Higher proportion values 308-312 result in a further reduction of power than lower proportion values 308-312. In some examples, the interface 300 may require the sum of the proportions 308-312 to total 100%. In other examples, the interface 300 may normalize the proportion values 308-312.

In the example of FIG. 3, while the engine speed is less than a threshold speed (indicating that the engine is overloaded), the control circuitry 108 reduces the output or demand by each of the subsystems simultaneously. For each unit of total output reduction or demand reduction, the example control circuitry 108 reduces the output or demand of the subsystems 302-306 according to the proportions 308-312 (e.g., by a ratio of the corresponding proportion value 308-312 to the total of the proportion values 308-312). For example, for a 10 Watt (W) reduction in total demand on the engine 102, the control circuitry 108 folds back the hydraulics subsystem 302 by 1.5 W (e.g., 15%), the air compressor subsystem 304 by 3 W (e.g., 30%), and the chassis power subsystem 306 by 5.5 W (e.g., 55%).

The interface 300 may be modified to set load shed ratios (e.g., proportion values) for any number of subsystems. In some examples, the interface 300 may permit one or more proportions 308-312 to be set to 0%, in which case the control circuitry 108 prioritizes the subsystems having a proportion value 308-312 of 0% and does not fold back those subsystems until other subsystems have been completely folded back.

While the example interface 300 includes a load shed ratio for 3 subsystems, the interface 300 may enable specifying load shed ratios for 2, 4, or more subsystems. For example, instead of specifying a binary priority between two subsystems as illustrated in FIG. 2A, the example slider may be used to set a load shed ratio (e.g., proportions) for the two subsystems.

In some examples, the user interface 114 may implement a combination of priorities and load shed ratios, such as by creating multiple priority groups of subsystems. The different priority groups may be ranked (e.g., rankings similar to the rankings in FIG. 2B), and/or one of two groups may be selected as the priority (e.g., similar to the selection in FIG. 2A). Within each priority group having multiple subsystems, a load shed ratio may be configured by specifying proportion values as illustrated in FIG. 3, in which the proportion values are relative to the subsystems within the priority group instead of being relative to all subsystems.

FIG. 4 illustrates another example user interface 400 that may be used to configure a load management priority of the engine-driven power system 100 of FIG. 1. The example interface 400 lists multiple power subsystems 402, 404 that receive power from the intermediate voltage bus 140 of FIG. 1. The example interface 400 includes an auxiliary subsystem 402 (e.g., the auxiliary power supply 130) and a welding subsystem (e.g., the welding-type power supply 128). Each of the subsystems 402, 404 has respective upper voltage thresholds 406, 408 and lower voltage thresholds 410, 412. The interface 400 enables an operator (e.g., via the input device(s) 122) to configuring the voltage thresholds 406-412, or limits, to control prioritization of the subsystems 402, 404, and to trigger folding back of the subsystems 402, 404 in response to total demand on the engine 102 exceeding the engine capacity. The example voltage ranges set by the limits 406-412 may partially overlap for different subsystems 402, 404.

As the total demand on the engine 102 exceeding the engine capacity due to one or both of the subsystems 402, 404 (e.g., electrical loads), the voltage of the intermediate voltage bus 140 decreases from a nominal (e.g., target) bus voltage, such as 450 VDC. In the example of FIG. 4, the welding subsystem 404 is configured with an upper limit 408 of 420 VDC and a lower limit 412 of 390 VDC. As the bus voltage decreases, the control circuitry 108 folds back the welding subsystem 404 in response to the bus voltage decreasing below the upper limit 408 (e.g., 420 VDC), and completely folds back the welding subsystem 404 when the bus voltage is equal to or less than the lower limit 412 (e.g., 390 VDC). Similarly, as the bus voltage decreases further, the control circuitry 108 also folds back the auxiliary subsystem 402 in response to the bus voltage decreasing below the upper limit 406 (e.g., 390 VDC), and completely folds back the auxiliary subsystem 402 when the bus voltage is equal to or less than the lower limit 410 (e.g., 360 VDC).

While the examples of FIGS. 2A, 2B, 3, and 4 refer to reduction of output in response to total demand on the engine 102 exceeding the capacity of the engine 102, power and/or demand may be restored to the power subsystems in the opposite manner as the folding back is performed. For example, when priorities or rankings are configured, the demand by a higher priority subsystem may be completely restored by the control circuitry 108 before the demand of a lower priority subsystem is restored. In examples in which a load shed ratio is configured, the demand by the subsystems may be restored in a proportional manner according to the configured proportion values. When bus voltage ranges are configured, the demand by the subsystems may be restored as the bus voltage increases above the respective thresholds (e.g., upper and/or lower voltage limits).

Figure 5:
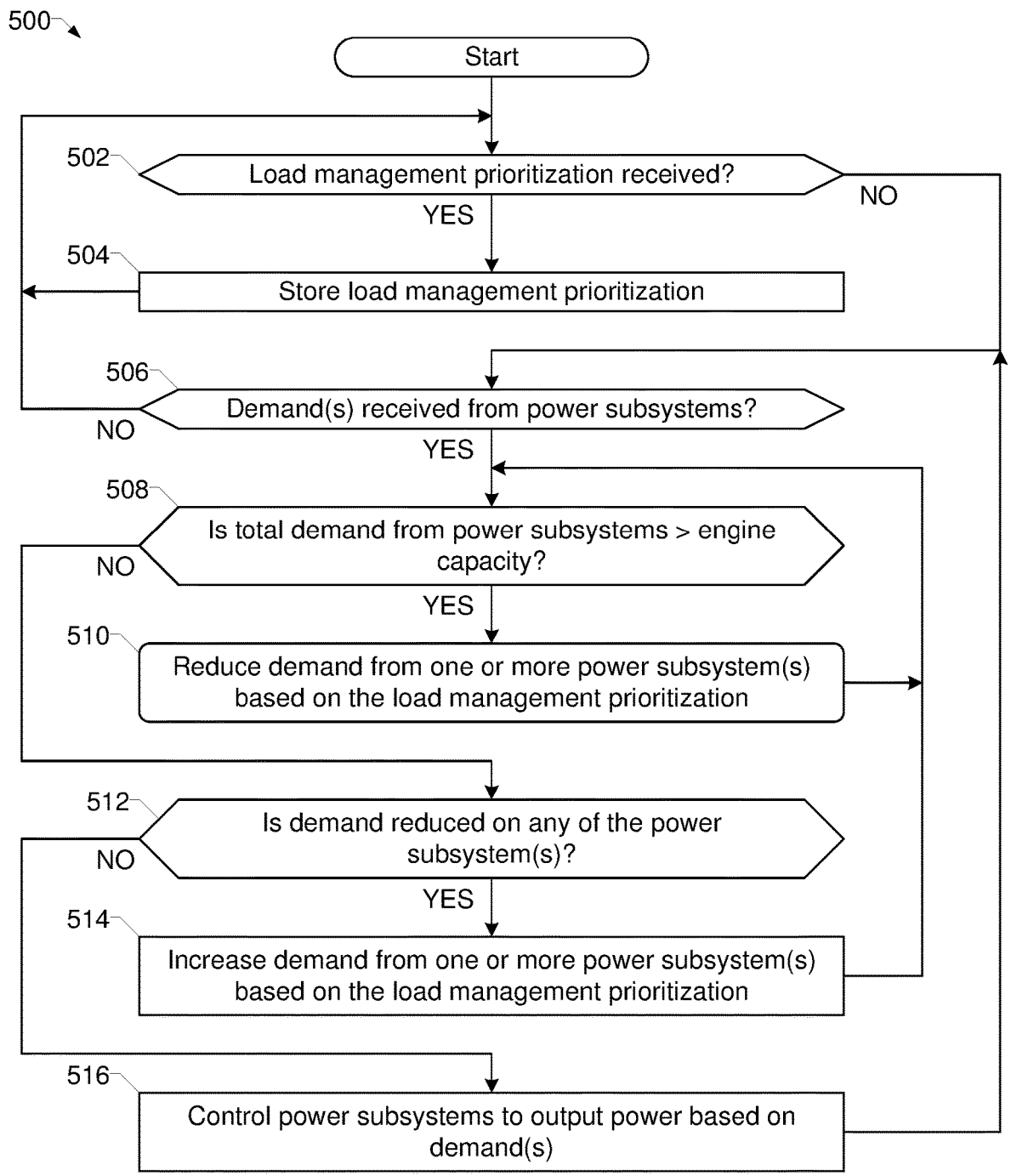
FIG. 5 is a flowchart representative of example machine readable instructions which may be executed to implement the control circuitry of FIG. 1 to control folding back of power subsystems of an engine-driven power supply based on a load management priority.

FIG. 5 is a flowchart representative of example machine readable instructions 500 which may be executed by the control circuitry 108 of FIG. 1 to control folding back of power subsystems of the engine-driven power system 100 based on a load management priority.

At block 502, the control circuitry 108 determines whether a load management prioritization has been received. For example, the control circuitry 108 may receive a prioritization, a ranking, load shed ratios, voltage limits, and/or any other type of prioritization of the power subsystems of the power system 100, via the input device(s) 122 and/or the interfaces 200, 210, 300, 400. If a load management prioritization has been received (block 502), at block 504 the control circuitry 108 stores the load management prioritization (e.g., in the storage device(s) 120). Control then returns to block 502.

If a load management prioritization has been received (block 502), at block 506 the control circuitry 108 determines whether demand(s) have been received from the power subsystems. For example, the control circuitry 108 may monitor for demands from the power conditioning circuitry 106, the hydraulic system 124, the air compressor 126, the welding-type power supply 128, the auxiliary power supply 130, the vehicle power subsystem 132, the external power supply subsystem 136, and/or any other power subsystem(s). If no demand(s) have been received (block 506), control returns to block 502 to monitor for a load management prioritization (block 502) and/or a demand (block 506).

When at least one demand has been received (block 506), at block 508 the control circuitry 108 determines whether a total demand from the power subsystems is greater than an engine capacity. In some examples, the control circuitry 108 determines that the total demand is greater than the capacity when the engine speed is less than a threshold, or at least a threshold amount less than the target speed.

If the total demand from the power subsystems is greater than the engine capacity (block 508), at block 510 the control circuitry 108 reduces the demand from one or more of the power subsystems based on the load management prioritization. For example, the control circuitry 108 may reduce the demand or output by one or more of the power subsystems based on a configured priority, a configured ranking, a configured load shedding ratio, a configured bus voltage threshold, and/or any other prioritization. Example implementations of block 510 are disclosed below with reference to FIGS. 6, 7, 8, and 9. Control then returns to block 508 to monitor the total demand (e.g., after reduction) to the engine capacity.

If the total demand from the power subsystems is not greater than the engine capacity (block 508), at block 512 the control circuitry 108 determines whether a demand is reduced on any of the power subsystems (e.g., if any of the power subsystems are currently being folded back). For example, the control circuitry 108 may store or log the folding back of the power subsystems while the engine 102 is overloaded to subsequently restore the power subsystems when the total demand has been reduced. If a demand is reduced on any of the power subsystems (block 512), at block 514 the control circuitry 108 increases the demand from one or more of the power subsystem(s) based on the load management prioritization. For example, the control circuitry 108 may restore demand by the subsystems in an opposite order as the demand was reduced while the engine 102 was overloaded. Control then returns to block 508 to monitor the total demand (e.g., after reduction) to the engine capacity.

If no demands are reduced on any of the power subsystems (block 512), at block 516 the control circuitry 108 controls the power subsystems to output power based on the respective demands by the power subsystems. Control then returns to block 506 to determine whether the demand(s) are still present.

Figure 6:
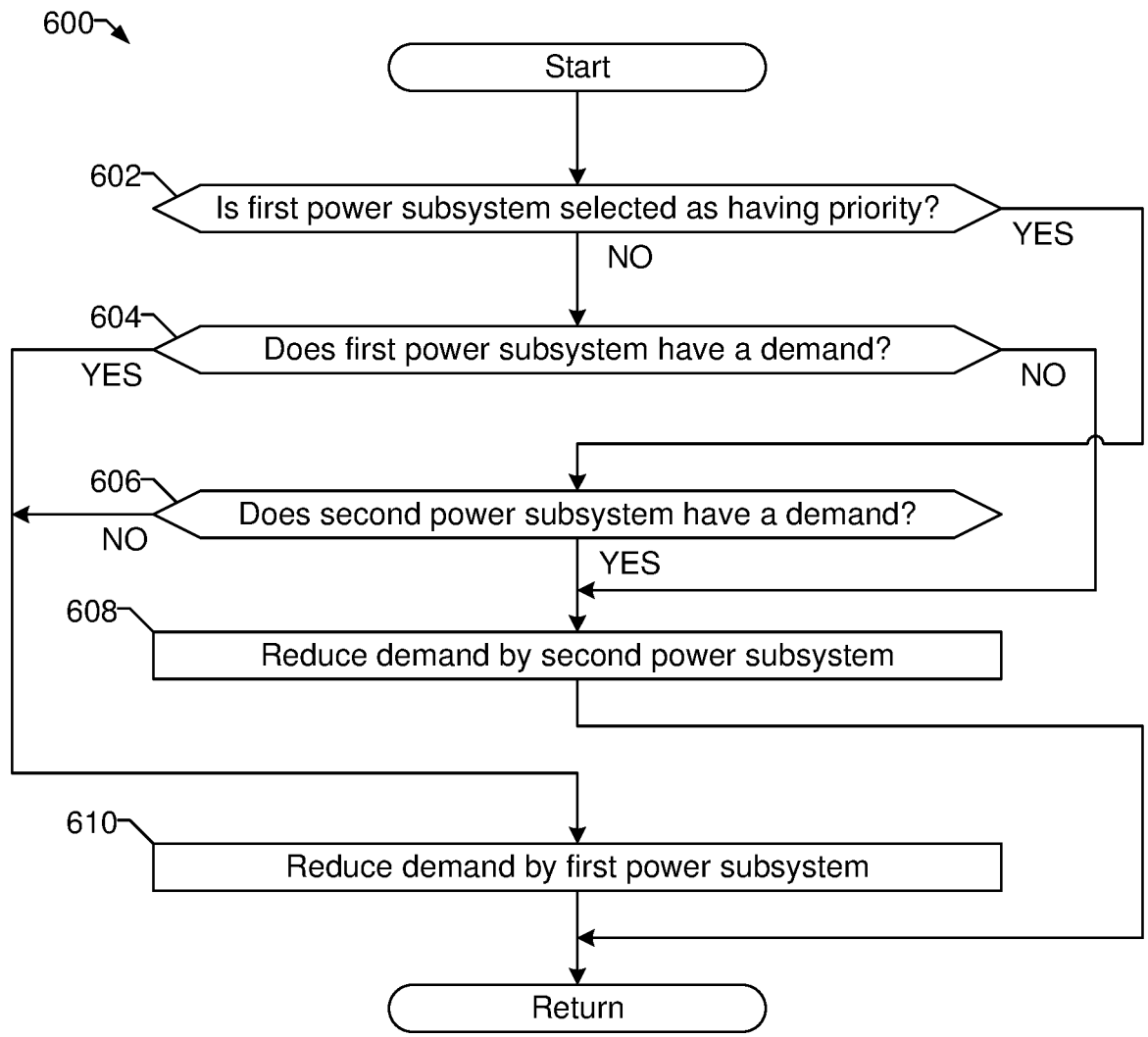
FIG. 6 is a flowchart representative of example machine readable instructions which may be executed to implement the control circuitry of FIG. 1 to reduce a demand from one or more power subsystem(s) based on a load management prioritization involving a selected prioritization between two power subsystems.

FIG. 6 is a flowchart representative of example machine readable instructions 600 which may be executed by the control circuitry 108 of FIG. 1 to reduce a demand from one or more power subsystem(s) based on a load management prioritization involving a selected prioritization between two power subsystems. For example, the control circuitry 108 may execute the instructions 600 to implement block 510 of FIG. 5 when a load management priority such as the priority disclosed above with reference to FIG. 2A is configured.

At block 602, the control circuitry 108 determines whether a first power subsystem (e.g., of the two power subsystems 204, 206 of FIG. 2A) is selected as having priority. If the first power subsystem does not have priority (block 602), at block 604 the control circuitry 108 determines whether there is a demand by the first power subsystem. If the first power subsystem has priority (block 602), at block 606 the control circuitry 108 determines whether there is a demand by the second power subsystem.

If the first power subsystem does not have priority and the first power subsystem does not have a demand (block 604), or if the first power subsystem has priority and the second power subsystem has a demand (block 606), at block 608 the control circuitry 108 reduces the demand by the second power subsystem. Conversely, if the first power subsystem does not have priority and the first power subsystem has a demand (block 604), or if the first power subsystem has priority and the second power subsystem does not have a demand (block 606), at block 610 the control circuitry 108 reduces the demand by the first power subsystem. After reducing the demand (block 608 or 610), the instructions 600 end and control returns to block 508 of FIG. 5.

Figure 7:
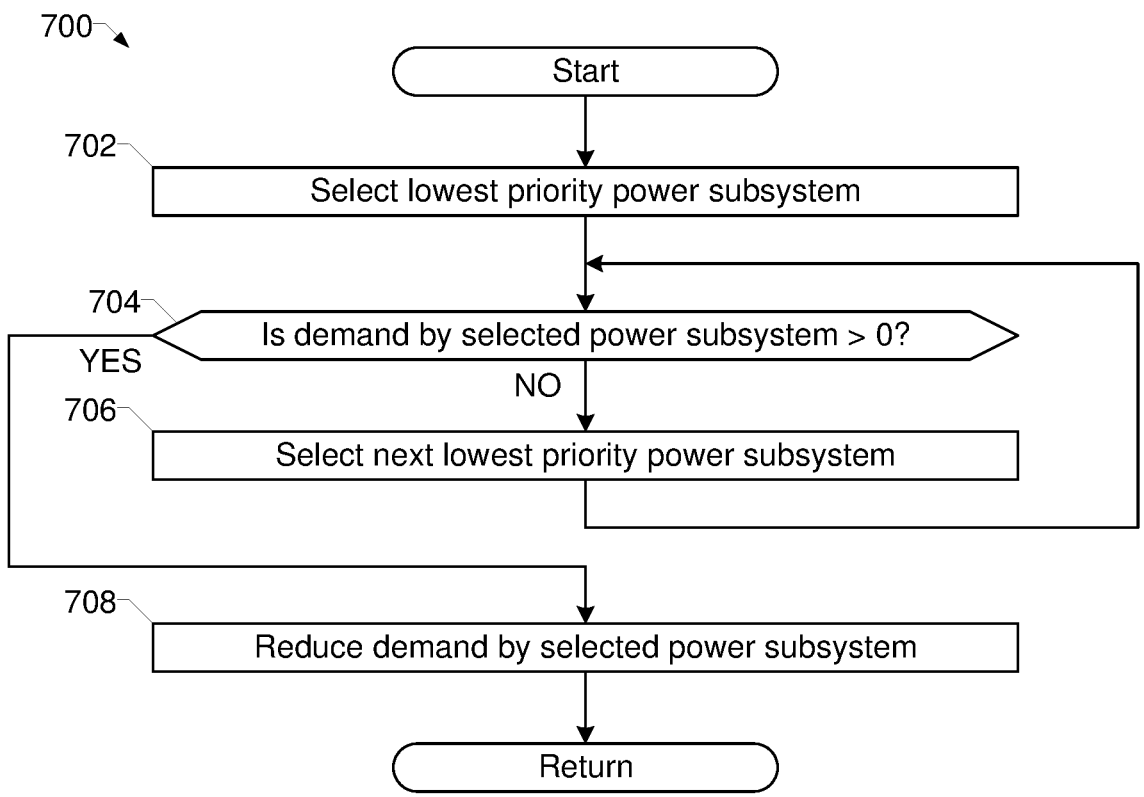
FIG. 7 is a flowchart representative of example machine readable instructions which may be executed to implement the control circuitry of FIG. 1 to reduce a demand from one or more power subsystem(s) based on a load management prioritization involving a ranking of three or more power subsystems.

FIG. 7 is a flowchart representative of example machine readable instructions which may be executed by the control circuitry 108 of FIG. 1 to reduce a demand from one or more power subsystem(s) based on a load management prioritization involving a ranking of three or more power subsystems. For example, the control circuitry 108 may execute the instructions 600 to implement block 510 of FIG. 5 when a load management priority such as the ranking disclosed above with reference to FIG. 2B is configured.

At block 702, the control circuitry 108 selects the lowest priority subsystem in the ranking. For example, in the ranking illustrated in FIG. 2B, the control circuitry 108 selects the HVAC subsystem 218. At block 704, the control circuitry 108 determines whether the demand by the selected power subsystem is greater than 0 (e.g., whether the selected power subsystem does not have a demand and/or whether the selected power subsystem is completely folded back).

If the demand by the selected power subsystem is 0 (block 704), at block 706 the control circuitry 108 selects the next lowest priority power subsystem. In the example ranking illustrated in FIG. 2B, the control circuitry 108 selects the welding subsystem 212 if the HVAC subsystem 218 is currently selected. Control then returns to block 704.

If the demand by the selected power subsystem is greater than 0 (block 704), at block 708 the control circuitry 108 reduces the demand by the selected power subsystem. After reducing the demand (block 708), the instructions 700 end and control returns to block 508 of FIG. 5.

Figure 8:
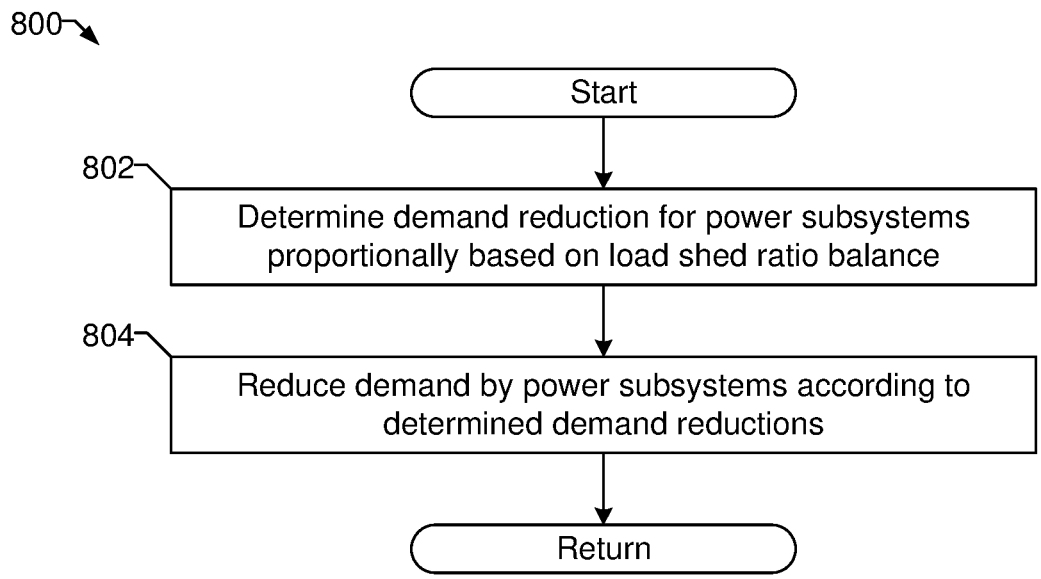
FIG. 8 is a flowchart representative of example machine readable instructions which may be executed to implement the control circuitry of FIG. 1 to reduce a demand from one or more power subsystem(s) based on a load management prioritization involving a load shed ratio balance of two or more power subsystems.

FIG. 8 is a flowchart representative of example machine readable instructions 800 which may be executed by the control circuitry 108 of FIG. 1 to reduce a demand from one or more power subsystem(s) based on a load management prioritization involving a load shed ratio balance of two or more power subsystems. For example, the control circuitry 108 may execute the instructions 600 to implement block 510 of FIG. 5 when a load management priority such as the load shed ratios disclosed above with reference to FIG. 3 is configured.

At block 802, the control circuitry 108 determines a demand reduction for power subsystems proportionally based on load shed ratio balance. For example, if the control circuitry 108 has a demand reduction increment of 100 W using the proportions illustrated in FIG. 3, the control circuitry 108 would determine a demand reduction by the hydraulics subsystem 302 by 15 W (e.g., 15%), the air compressor subsystem 304 by 30 W (e.g., 30%), and the chassis power subsystem 306 by 55 W (e.g., 55%).

At block 804, the control circuitry 108 reduces the demand by the power subsystems according to the determined demand reductions. After reducing the demand (block 804), the instructions 800 end and control returns to block 508 of FIG. 5.

Figure 9:
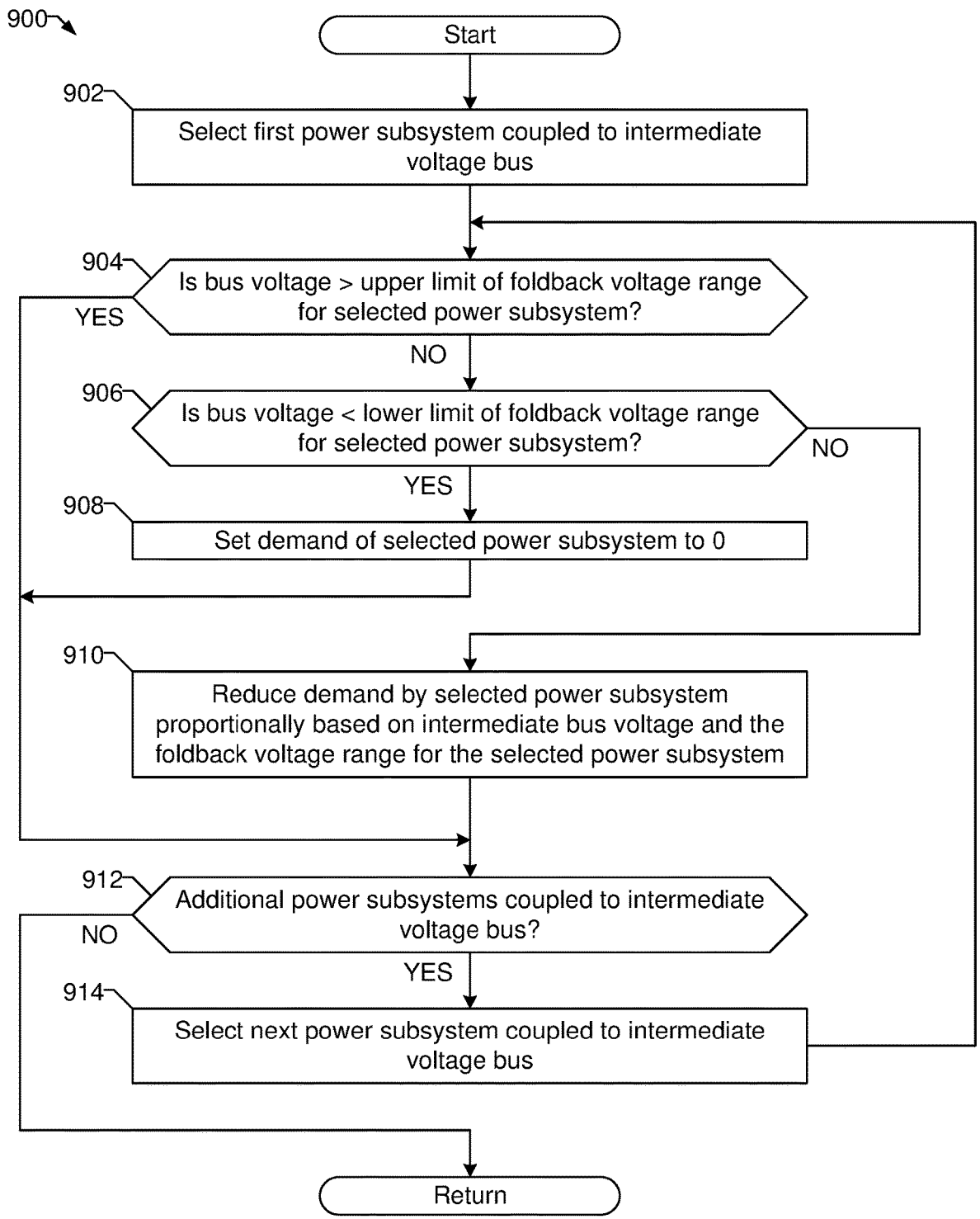
FIG. 9 is a flowchart representative of example machine readable instructions 900 which may be executed to implement the control circuitry 108 of FIG. 1 to reduce a demand from one or more power subsystem(s) based on a load management prioritization involving power subsystems coupled to an intermediate voltage bus.

FIG. 9 is a flowchart representative of example machine readable instructions which may be executed to implement the controller of FIG. 1 to reduce a demand from one or more power subsystem(s) based on a load management prioritization involving power subsystems coupled to an intermediate voltage bus. For example, the control circuitry 108 may execute the instructions 600 to implement block 510 of FIG. 5 when a load management priority such as the bus voltage thresholds disclosed above with reference to FIG. 4 is configured.

At block 902, the control circuitry 108 selects a first power subsystem coupled to the intermediate voltage bus (e.g., the voltage bus 140 of FIG. 1). For example, the control circuitry 108 may select the auxiliary power subsystem 402 of FIG. 4. At block 904, the control circuitry 108 determines whether the bus voltage of the intermediate voltage bus 140 is greater than the upper limit of the foldback voltage range (e.g., the upper limit 406) for the selected power subsystem. For example, the control circuitry 108 may determine whether the bus voltage is less than the upper limit 406 of 390 VDC.

If the bus voltage of the intermediate voltage bus 140 is not greater than the upper limit of the foldback voltage range (block 904), at block 906 the control circuitry 108 determines whether the bus voltage is less than the lower limit of the foldback voltage range for the selected power subsystem. For example, the control circuitry 108 may determine whether the bus voltage is less than the lower limit 410 of 360 VDC. If the bus voltage is less than the lower limit of the foldback voltage range for the selected power subsystem (block 906), at block 908 the control circuitry 108 sets the demand for the selected power subsystem to 0.

If the bus voltage is not greater than the upper limit (block 904) and is not less than the lower limit of the foldback voltage range for the selected power subsystem (block 906), at block 910 the control circuitry 108 reduces the demand by the selected power subsystem proportionally based on the intermediate bus voltage and the foldback voltage range for the selected power subsystem. For example, if the bus voltage is 375 (e.g., 50% between the upper voltage limit 406 and the lower voltage limit 410), the control circuitry 108 folds back the selected power subsystem by 50% of the demand by the selected power subsystem.

After reducing the demand for the selected power subsystem (block 910), after setting the demand to 0 (block 908), or if the bus voltage is greater than the upper limit of the foldback voltage range (block 904), at block 912 the control circuitry 108 determines whether there are additional power subsystems coupled to the intermediate voltage bus to be evaluated. If there are additional power subsystems (block 912), at block 914 the control circuitry 108 selects the next power subsystem coupled to the intermediate voltage bus, and control returns to block 904 to evaluate the selected power subsystem.

When there are no further power subsystems (block 912), the instructions 900 end and control returns to block 508 of FIG. 5.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be an processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An engine-driven power system, comprising:
   an engine;
   a generator configured to convert mechanical power output by the engine to electrical power;
   a first power subsystem configured to convert at least one of the mechanical power or the electrical power to a first power output;
   a second power subsystem configured to convert at least one of the mechanical power or the electrical power to a second power output, wherein the first power subsystem and the second power subsystem are configurable to output at least a portion of the first power output and at least a portion of the second power output simultaneously;
an input device configured to control a load management priority associated with the first power subsystem and the second power subsystem, wherein the load management priority comprises an adjustable balance between the first and second power subsystems, wherein the balance comprises a first percentage corresponding to the first power subsystem and a second percentage corresponding to the second power subsystem; and
control circuitry configured to:
control the first power subsystem to output the first power output based on a first demand;
control the second power subsystem to output the second power output based on a second demand; and
in response to determining that a total demand, including the first demand and the second demand, exceeds a capacity of the engine, control the first power subsystem to proportionally fold back the first power subsystem and control the second power subsystem to proportionally fold back the second power subsystem based on the load management priority and based on the balance while the total demand exceeds the capacity of the engine.

2. The engine-driven power system as defined in claim 1, wherein the first power subsystem comprises at least one of: a hydraulic system configured to output the first power output as hydraulic power; an air compressor configured to output the first power output as pneumatic power; a welding-type power supply configured to output the first power output as welding-type power; an auxiliary power supply configured to output the first power output as at least one of AC power or DC power; an external power supply configured to convert at least one of the AC power or the DC power from the auxiliary power supply or the generator to at least one of AC power or DC power and configured to communicate with the controller; or a vehicle subsystem configured to convert the electrical power to at least one of AC power or DC power to power at least one component of a vehicle on which the engine-driven power system is mounted.

3. The engine-driven power system as defined in claim 1, wherein the second power subsystem comprises at least one of: a hydraulic system configured to output the second power output as hydraulic power; an air compressor configured to output the second power output as pneumatic power; a welding-type power supply configured to output the second power output as welding-type power; an auxiliary power supply configured to output the first power output as at least one of AC power or DC power; an external power supply configured to convert at least one of the AC power or the DC power from the auxiliary power supply or the generator to at least one of AC power or DC power and configured to communicate with the controller; or a vehicle subsystem configured to convert the electrical power to at least one of AC power or DC power to power at least one component of a vehicle on which the engine-driven power system is mounted.

4. The engine-driven power system as defined in claim 1, further comprising a preregulator configured to convert the electrical power from the generator to output a voltage bus based on a target bus voltage, and the first power subsystem and the second power subsystem are coupled to receive the electrical power from the voltage bus.

5. The engine-driven power system as defined in claim 4, wherein the control circuitry is configured to determine that the total demand exceeds the capacity of the engine based on a voltage of the voltage bus.

6. The engine-driven power system as defined in claim 1, further comprising a third power subsystem configured to convert at least one of the mechanical power or the electrical power to a third power output, wherein the balance is between the first power subsystem, the second power subsystem, and the third power subsystem.

7. The engine-driven power system as defined in claim 6, wherein the control circuitry is configured to proportionally fold back the first power subsystem, the second power subsystem, or the third power subsystem, based on the balance, while the total demand exceeds the capacity of the engine.

8. The engine-driven power system as defined in claim 6, wherein the control circuitry is configured to determine the balance based on values received via the input device.

9. The engine-driven power system as defined in claim 1, wherein the percentages of the balance have a sum of 100%.

10. The engine-driven power system as defined in claim 1, wherein the first percentage and the second percentage can each be set to a percentage more than 0% and less than 100%.

11. The engine-driven power system as defined in claim 1, wherein the control circuitry is configured to control the first power system and the second power system to proportionally fold back according to a ratio based on the first percentage and the second percentage.

12. An engine-driven power system, comprising:
an engine;
a generator configured to convert mechanical power output by the engine to electrical power;
a hydraulic subsystem configured to convert at least one of the mechanical power or the electrical power to a hydraulic output;
a pneumatic subsystem configured to convert at least one of the mechanical power or the electrical power to a pneumatic output, wherein the hydraulic subsystem and the pneumatic subsystem are configurable to output at least a portion of the hydraulic output and at least a portion of the pneumatic output simultaneously;
an input device configured to control a load management priority associated with the hydraulic subsystem and the pneumatic subsystem, wherein the load management priority comprises an adjustable balance between the hydraulic subsystem and the pneumatic subsystem, wherein the balance comprises a first percentage corresponding to the hydraulic subsystem and a second percentage corresponding to the pneumatic subsystem; and
control circuitry configured to:
control the hydraulic subsystem to output the hydraulic output based on a hydraulic demand;
control the pneumatic subsystem to output the pneumatic output based on a pneumatic demand; and
in response to determining that a total demand, including the hydraulic demand and the pneumatic demand, exceeds a capacity of the engine, control the hydraulic subsystem to proportionally fold back the hydraulic subsystem and control the pneumatic subsystem to proportionally fold back the pneumatic subsystem based on the load management priority and based on the balance while the total demand exceeds the capacity of the engine.

13. The engine-driven power system as defined in claim 12, further comprising an electrical power subsystem configured to convert the electrical power to at least one of a welding-type power output, an AC power output, or a DC power output, wherein the balance further comprises a third percentage corresponding to the electrical power subsystem.

14. The engine-driven power system as defined in claim 12, wherein the control circuitry is configured to determine that the total demand exceeds the capacity of the engine when a difference between a determined engine speed and a target engine speed is at least a threshold.

* * * * *